Feb. 25, 1969    A. SARGEANT    3,429,069
ELECTRICALLY POWERED VEHICLES
Filed May 24, 1966    Sheet 1 of 2

INVENTOR
ARCHIBALD SARGEANT
BY
Dugger Johnson + Westman
ATTORNEYS

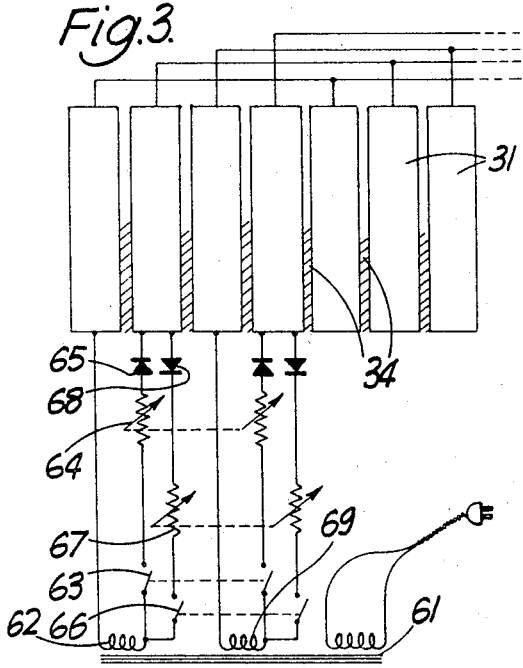
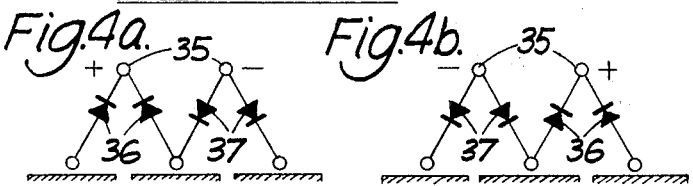
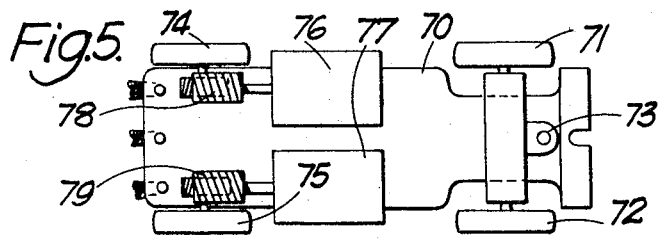

3,429,069
ELECTRICALLY POWERED VEHICLES
Archibald Sargeant, Bognor Regis, England, assignor to Rosemount Engineering Company Limited, Bognor Regis, Sussex, England, a British company
Filed May 24, 1966, Ser. No. 552,540
Claims priority, application Great Britain, May 24, 1965, 21,983/62
U.S. Cl. 46—244                12 Claims
Int. Cl. A63h 33/26

ABSTRACT OF THE DISCLOSURE

An electrically powered vehicle, particularly a toy vehicle, has at least one drive motor energized by contacts on the vehicle co-operating with fixed conductors and has steering means on the vehicle operatively responsive to the voltage applied to the fixed conductors. In one arrangement, the steering mechanism is spring-biased in one direction and moved against the bias electromagnetically, a brake being provided to stop movement of the steering mechanism on any interruption of the power supply.

---

This invention relates to electrically powered vehicles and has for its principal object to provide an improved form of remote control for the steering of such vehicles. The invention is applicable particularly to toy vehicles but may be used more generally, for example, in unmanned vehicles used in factories, warehouses and the like for carriage of goods or for towing trucks.

According to this invention, in an electrically powered vehicle in which electrical power is supplied to the vehicle through fixed conductors engaged by contact on the vehicle, steering means are provided operatively responsive to the voltage applied to said fixed conductors. The vehicle can thus be steered remotely by controlling the voltage applied to said fixed conductors.

In one arrangement, the vehicle has two driving motors driving respectively wheels, preferably rear wheels, on opposite sides of the vehicle, one motor having a characteristic such that the speed depends on the applied voltage and the other having a characteristic such that the speed is substantially independent of the applied voltage.

However, according to a preferred arrangement of the invention in an electrically powered vehicle in which the electrical power is supplied to the vehicle through fixed conductors engaged by contact elements on the vehicle, the vehicle has a driving motor energized by power from said contact elements and also has a steering mechanism biased in one direction by spring means and magnetic means energized from said contact elements for moving the steering mechanism against the spring bias so that the vehicle can be steered by adjusting the voltage applied to said fixed conductors. The motor can be arranged to drive the vehicle at a substantially constant speed over a range of voltages within which the magnetic means operates the steering mechanism; for example, the motor may be driven through a voltage stabilizing circuit, e.g., using a Zener diode or diodes. Alternatively the motor is a shunt wound D.C. motor; this has a speed which is substantially independent of the applied voltage over a suitable operating range of voltage.

It will thus be seen that the vehicle can be steered by controlling the voltage applied to said fixed conductors. The voltage can be adjusted gradually and thus the steering mechanism of the vehicle may be operated to move the wheels to any required position within the range of operation of the steering mechanism.

The vehicle may be used on a track on which current is picked up from the surface over which the vehicle runs, or from an overhead conductor system. Conveniently, however, two vehicles are separately steerable by using a track, as described and claimed in the specification of copending application No. 21,983/65 and comprising one or more sets of four insulated conducting members extending side by side along the track, a first supply circuit for supplying potential of one polarity between a first member of the or each set and a second, adjacent member of the or each set, a second supply circuit for supplying an equal potential of same polarity between a third member of the or each set adjacent the second member and a fourth member of the or each set adjacent the third member, and two supply circuits for supplying potentials of polarity opposite to that of said first and second supply circuits, between two adjacent pairs of adjacent members. Thus two vehicles may be employed responding to signals of opposite polarity, the vehicles having contact elements for picking up current from adjacent conducting members. The potentials of opposite polarity may be applied to the same members as the first potentials, but during periods alternating with those during which the potentials of said one polarity are applied. Alternatively the potentials of the two polarities can be applied simultaneously, the two potentials of the said opposite polarity being applied respectively between the fourth and first members, and between the second and third members. In this latter case, each vehicle must have means for picking up both supply voltages and for selecting that of the required polarity. The potentials supplied by the supply circuits are made separately adjustable so that the two vehicles can be separately steered by control of the respective potentials.

The track preferably includes insulating strips separating the members the width of the strips being smaller than that of the members. These insulating strips may be provided with convex upper surfaces extending above the upper surfaces of the conducting members. The members may be straight, but this is not essential.

If the motor is a shunt wound D.C. motor, the steering mechanism may be biased in one direction by spring means and the vehicle provided with magnetic means energized by the field coil of the motor for operating the steering mechanism.

The steering mechanism is preferably provided with a brake to prevent the action of the spring means during short interruption of current to the field coil. The brake may be operably connected to magnetic material energizable by the field coil of the motor so that the brake is held out of engagement with the steering mechanism during energization of the field coil.

One embodiment of the invention will now be described, reference being made to the accompanying drawings in which:

FIGURE 3 is a circuit diagram of a track energized by alternating current;

FIGURE 4 is a circuit diagram of two alternative rectifier arrangements for vehicles of FIGURE 1; and FIGURE 5 shows diagrammatically an alternative construction of vehicle.

Figure 1:
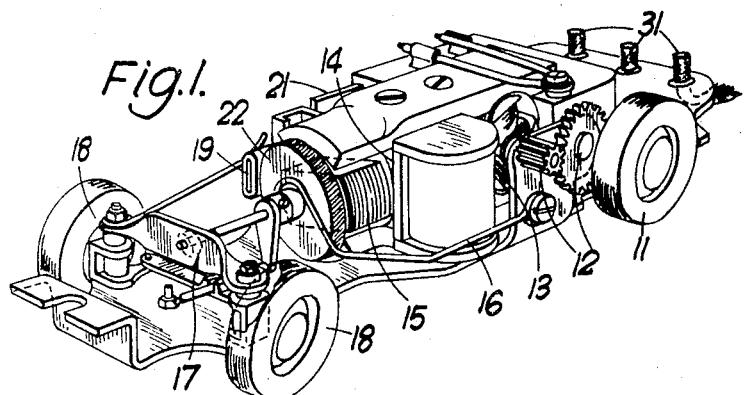
FIGURE 1 is a perspective view of the chassis of a vehicle.

Referring to the drawings, a toy racing vehicle has its two rear wheels 11 driven through a reduction gear 12 from a shunt wound D.C. motor 13. With this type of motor, the speed at which the wheels 11 are driven is substantially independent of the supply voltage to the D.C. motor over an appreciable range of voltage. The field coil of the motor is wound on a magnetic yoke 14 which yoke is extended towards the front of the vehicle, at which there is a soft iron armature 15. As the energization of the field coil increases, the soft iron armature 15 tends to align itself with the field in the field coil yoke 14. A spring 16 is provided to return the armature 15 to a rest position. A winding may be provided on the armature to improve the efficiency. The armature 15 is mechanically coupled to a steering mechanism 17 for the front wheels 18. A brake 19 of rubber or like material mounted on a locking plate 21 which is also in the field of the magnetic yoke 14 of the field coil is biased into engagement with the braking disc 22 in the steering mechanism and is held out of engagement during energization of the field coil.

According to the level of energization of the field coil, the wheels 18 are steered in a particular direction. If the energization of the field coil is slowly reduced, the wheels 18 are slowly turned back to the extreme position to which they are biased by the spring 16. Increase of energization turns the wheels in the opposite direction. If the energization of the field coil is suddenly reduced to zero, however, the brake 19 is released by the magnetic yoke and engages the braking disc 22 so that the wheels 18 are held in the direction in which they lay before de-energization of the field coil.

As will be seen from FIGURE 1, the pivot for turning the front wheels for steering the vehicle is slightly forward of the axis of the wheels so that the wheels form a trailing castor and thereby reducing any tendency to oversteer.

At the rear of the vehicle, in the embodiment shown in FIGURE 1, there are three brushes 31 in a line. The vehicle runs on a track 32 which comprises a number of parallel conducting members 33 separated by relatively narrow insulating segments 34 with convex upper surfaces. The three brushes 31 are spaced to contact respectively three adjacent track members 33. The three brushes 31 are connected to the two terminals 35 of the motor 13 through diodes 36, 37 (see FIGURE 4). The central brush is connected to one terminal through a diode 36 directed in one direction and to the other terminal by a diode 37 directed in the other direction. One of the outside brushes is connected to the first terminal by a diode 36 also directed in the first direction, and the other brush is connected to the other terminal by a diode 37 also directed in said other direction. This arrangement of the rectifiers provides a positive voltage at one supply terminal 35 and a negative voltage at the other supply terminal 35 when the three track members contacted by the brushes are provided with positive, negative and positive voltages respectively or negative, positive and negative voltages respectively. Thus in either of these possible conditions of the particular track members 33 engaged by the brushes 31, the vehicle will be driven in the same direction.

Figure 2:
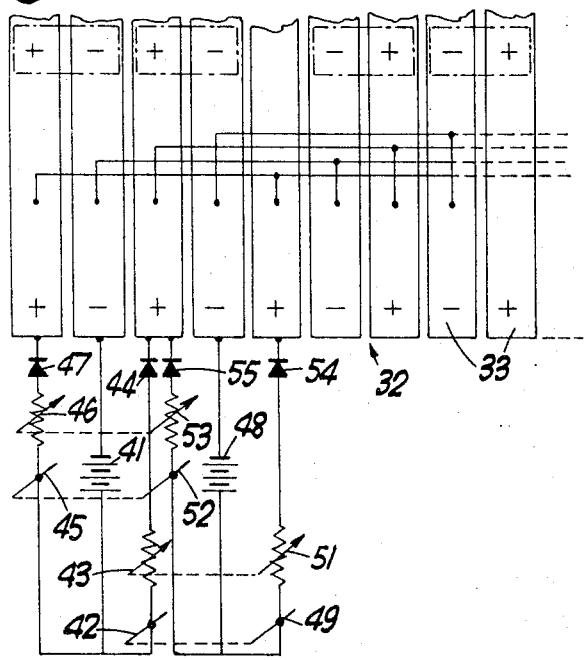
FIGURE 2 is a circuit diagram of one construction of track energized by direct current on which the vehicle of FIGURE 1 may be used.

In the circuit of FIGURE 2, the track 32 is supplied with positive and negative direct potentials in alternate members 33. Each member supplied with a positive potential is supplied with one potential with respect to the left-hand adjacent negative member and with another potential with respect to the adjacent right-hand negative member. The negative terminal of a direct voltage supply source, shown as a battery 41, is connected to one negative member and two arms extend from the positive terminal of the battery, one through a switch 42, an adjustable resistor 43 and rectifier 44 to the right-hand positive member adjacent the negative member, and the other through a switch 45, a second adjustable resistor 46 and rectifier 47 to the left-hand positive member adjacent the negative member.

The negative terminal of a second supply source, shown as a second battery 48, is connected to an adjacent negative member, and the positive terminal of this second battery is connected to the positive members on either side of the negative member by two arms, one containing a switch 49 ganged to switch 42, an adjustable resistor 51 ganged, and equal in value, to resistor 43 and a rectifier 54 connected to the right-hand adjacent positive member, and the other containing a switch 52 ganged to switch 45, an adjustable resistor 53 ganged, and equal in value, to resistor 46 and a rectifier 55 connected to the adjacent left-hand positive member. As shown in FIGURE 2, the track may have more than four members 33. In this case, the members 33 are arranged effectively in groups of four adjacent members. Corresponding members in the different groups are connected in parallel; thus the first member is connected to the fifth, the second to the sixth and so on. The rectifiers 44, 47, 54, 55 prevent interference between right-hand and left-hand arms.

When the three brushes 31 of the vehicle contact positive, negative and positive members respectively and its rectifiers 36, 37 are arranged to supply positive potential to the left-hand supply terminal 35 and a negative potential to the right-hand supply terminal 35 as shown in FIGURE 4(a), the vehicle will take its power from the left-hand and centre member of the three members contacted by the brushes. The vehicle will therefore be under the control of the switch 45 and adjustable resistor 46 in the left-hand arm connected to the battery 41.

If a vehicle has its diodes 36, 37 arranged between the brushes 31 and the supply terminals 35 so that a negative potential appears at the left-hand supply terminal and a positive potential at the right-hand as shown in FIGURE 4(b), when the vehicle is placed on the same three members, the vehicle will derive its supply from the centre and the right-hand members of the three contacted by the brushes, so that the vehicle will be under the control of the switch 42 and adjustable resistor 43 in the right-hand arm connected to the battery 41. By controlling the adjustable resistors 46, 53 in the two arms independently, independent control of the two vehicles on the same three members of the track can be arranged.

A steady increase of the potential applied through one or other of the arms connected to the battery 41 will, as described above, control the steering of the vehicle. Intermittent breaks in the potentials supplied through the arms will control the mean speed of the vehicle without substantially affecting the steering, due to the brake 19.

As the vehicle is steered from one set of members 33 to another the brushes will pass over the insulating segments 34 between the members, and the drive to the motor will be discontinued. The momentum of the vehicle should be sufficient to carry the vehicle brushes 31 on the adjacent members 33. It will be seen that as the three brushes of the first vehicle (with a positive left-hand supply terminal 35) moves on to the adjacent members having a positive potential central member and negative potential members on either side the motor will derive its supply from the central and right-hand member of the three. The potential between the two members supplying the vehicle is thus derived from the negative terminal of the secondary battery 48 and from its left-hand arm, whose switch 52 is ganged to switch 45 and whose adjustable resistor 53 is ganged to and equal to the adjustable resistor 46 in the left-hand arm connected to the first battery 41. The potential supplied to the motor is therefore the same as it was when the brushes were on the first three members, so that the vehicle remains under the control of the adjustable resistors in the left-hand arms of the battery circuits. Similarly, the vehicle with a negative left-hand supply terminal remains under the control of the switches and adjustable resistors in the right-hand arms on the battery circuits.

FIGURE 3 shows a circuit arrangement for supplying the track members with alternating current. The vehicles themselves are unchanged, the current being rectified by the diodes 36, 37. In FIGURE 3, a transformer 61 is fed from the alternating current mains, one secondary winding 62 being connected between a first track member and through two parallel arms to a second adjacent track member. The first arm contains a switch 63, a first adjustable resistor 64 and a diode 65 directed in one direction, and the second arm contains a second switch 66, a second adjustable resistor 67 and a diode 68 directed in the other direction. In one half cycle of the mains supply, current will be fed through the first arm and the second member, and in the second half cycle of the supply current be fed through the second arm and the second member in the reverse direction.

The transformer has a second secondary winding 69 connected between the third member adjacent to the second member and through two parallel arms to the fourth member. The two arms in the second circuit are identical to the two arms of the first circuit, and the adjustable resistors and switches of the first arms are ganged together, as are those of the second arms. The effect of the circuit of FIGURE 3 on the vehicle is similar to that of FIGURE 2, so that vehicles with a positive left-hand supply terminal lie under the control of the switch and adjustable resistor in one of the parallel arms, whereas vehicles with a negative left-hand supply terminal lie under the control of the switch and resistor in the second of the parallel arms of each secondary winding.

To avoid vehicles becoming stuck on the insulated segments when they are driven straight down the track, the upper surfaces of insulating segments 34 are domed so that the brushes tend to slip onto the track members on either side. The members 33 moreover may be formed in wavy lines so that the vehicle driven is unlikely to be driven parallel to the insulating segments.

In place of the diodes 36, 37, alternative switching arrangements may be used to supply a voltage of the desired polarity between the supply terminals 35. For example, alternate track members may be formed of ferromagnetic material and a magnet on the vehicle may be mounted to operate a switch controlling the polarity of the supply terminal voltage in response to the relative positions of the magnet and the ferromagnetic track member. The switch could be operated to different positions according to whether the track member under the magnet is or is not of ferromagnetic materials.

The system has been described for operating two vehicles on the same track, each vehicle having its steering and driving operable from the voltage across the same two supply terminals. The system may be adapted to operate a single vehicle having two sets of supply terminals, one connected to receive voltages of one polarity to operate one function of the vehicle, the other connected to receive voltages of the opposite polarity to operate another function. The functions may include driving, steering and braking.

More than two vehicles, or more than two functions of one or more vehicles can be controlled by making sets of supply terminals responsive to voltages of different amplitudes or frequencies. For this purpose the vehicle must have suitable selector means responsive to the appropriate amplitudes and/or frequencies.

Although an arrangement has been more particularly described in which two vehicles are independently steerable over a surface formed of conductors carrying power for the vehicles, it is possible, by appropriate construction of the track and vehicles, to control more than two vehicles. Such a construction is described, for example, in the specification of the aforementioned copending application Ser. No. 552,504, filed May 24, 1966. If only a single vehicle is to be controlled, much simpler track arrangements may be employed and it is possible to use, for example, an overhead conductor, e.g., of wire mesh, as one pole of the supply to the vehicle, the other pole being constituted by a conductive sheet over which the vehicle travels.

In the arrangement of FIGURE 1, the motor winding is used for attracting the armature of the steering mechanism. This facilitates the construction of a small toy vehicle. It will be appreciated however that a separate winding may be provided if desired. A separate winding may also be provided for the brake armature. If a separate winding is used for the steering mechanism, this may be connected in parallel with the motor across the supply input terminals on the vehicle and, in this case, a voltage stabilizer, e.g., a Zener diode or diodes may be provided for stabilizing the voltage applied to the motor.

FIGURE 5 illustrates diagrammatically another construction of vehicle steerable in accordance with the amplitude of the applied voltage. In FIGURE 5, there is shown a chassis 70 with a pair of front wheels 71, 72 pivotally mounted at 73 forwardly of the wheel axis so that these wheels act as castor. The rear wheels 74, 75 are driven respectively by electric motors 76, 77 through worm drives 78, 79. The two motors are energized in parallel from the voltage picked up from the fixed conductors. One of the motors has a characteristic such that the speed is dependent on the applied voltage whilst the other motor is insensitive to the applied voltage, either by virtue of its inherent characteristic or by having a voltage stabilizer. It will be seen that the vehicle of FIGURE 5, like that of FIGURE 1, can be steered by controlling the applied voltage.

I claim:
1. An electrically powered vehicle comprising contact elements on the vehicle to pick up electrical power from fixed conductors, at least one drive motor on the vehicle energized from said contact elements, a steering mechanism on the vehicle operatively responsive to the voltage applied to said fixed conductors and a brake to prevent movement of the steering mechanism during any interruption of the power supply to the vehicle.

2. An electrically powered wheeled vehicle comprising contact elements on the vehicle to pick up electrical power from fixed conductors, and two driving motors driving respectively wheels on opposite sides of the vehicle, one motor having a characteristic such that the speed depends on the applied voltage and the other being a constant speed motor whereby the speed is substantially independent of the applied voltage.

3. An electrically powered vehicle as claimed in claim 2, wherein the motors each drive a rear wheel and wherein the vehicle has castoring front wheels.

4. An electrically powered vehicle in which the electrical power from a power supply is supplied to the vehicle from fixed conductors which vehicle comprises contacts elements on the vehicle to engage said conductors, a driving motor energized by power from said contact elements, a steering mechanism, spring means biasing the steering mechanism in one direction, magnetic means energized from said contact elements arranged to move the steering mechanism against the spring bias in accordance with the voltage at said contact elements so that the vehicle can be steered by adjusting the voltage applied to said fixed conductors, a brake for said steering mechanism, spring means operative on said brake to hold it in a position to prevent movement of the steering mechanism, and means energized by the power supply to said vehicle to hold the brake in an inoperative position.

5. An electrically powered vehicle as claimed in claim 4, wherein said motor is arranged to drive the vehicle at a substantially constant speed over a range of voltages within which the magnetic means operates the steering mechanism against the spring bias.

6. An electrically powered vehicle as claimed in claim 4 wherein said motor is a shunt wound D.C. motor.

7. An electrically powered vehicle as claimed in claim 6, wherein said magnetic means comprises a movable armature associated with the field coil of the motor.

8. An electrically powered vehicle as claimed in claim 4 wherein said motor is energized by a voltage stabilized circuit and wherein said magnetic means comprises a movable armature associated with a solenoid coil energized in accordance with the voltage picked up by said contact elements.

9. An electrically powered vehicle as claimed in claim 4, wherein said brake includes an armature of magnetic material and wherein said means energized by the power supply to hold the brake in an inoperative position comprises a coil energized by said supply.

10. The combination of a vehicle as claimed in claim 4 with a track having fixed conductors for supplying power to the vehicle and means for controlling the voltage applied to said fixed conductors thereby to control the steering of the vehicle.

11. An electrically powered vehicle as claimed in claim 9 wherein said coil is a field coil of said driving motor.

12. An electrically powered vehicle that is operated by electrical power from fixed conductors comprising a wheel supported chassis having steerable wheels, contact elements on the vehicle to engage said conductors, a driving motor on the chassis energized by power from said contact elements, operable steering means connected to said steerable wheels for steering the vehicle, first means on the chassis for operating the steering means, said first means including means energized from said contacts, and brake means on the vehicle for retaining the steering means in a fixed position during any interruption of the power supply to the vehicle.

References Cited

UNITED STATES PATENTS

| | | | |
|---|---|---|---|
| 3,205,618 | 9/1965 | Heytow | 46—244 |
| 3,239,963 | 3/1966 | Smith et al. | 46—244 |
| 3,344,553 | 10/1967 | Taggart | 46—244 X |

LOUIS G. MANCENE, *Primary Examiner.*

ROBERT F. CUTTING, *Assistant Examiner.*